United States Patent
Palmer, Jr. et al.

(10) Patent No.: US 11,111,559 B2
(45) Date of Patent: Sep. 7, 2021

(54) PROCESS FOR RECOVERING PRECIOUS METALS FROM CLAY-CONTAINING ORES

(71) Applicant: Ethox Chemicals, LLC, Greenville, SC (US)

(72) Inventors: Charles F. Palmer, Jr., Greenville, SC (US); John W. McKiernan, Greenville, SC (US); Charles F. Palmer, III, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 170 days.

(21) Appl. No.: 16/553,825

(22) Filed: Aug. 28, 2019

(65) Prior Publication Data
US 2020/0002783 A1    Jan. 2, 2020

Related U.S. Application Data

(62) Division of application No. 15/398,846, filed on Jan. 5, 2017, now Pat. No. 10,604,821.

(51) Int. Cl.
| | | |
|---|---|---|
| *C22B 11/00* | (2006.01) | |
| *C22B 11/08* | (2006.01) | |
| *C22B 60/02* | (2006.01) | |
| *C22B 15/00* | (2006.01) | |
| *C22B 3/20* | (2006.01) | |
| *C22B 3/12* | (2006.01) | |
| *C22B 3/16* | (2006.01) | |
| *C22B 43/00* | (2006.01) | |

(52) U.S. Cl.
CPC ............ *C22B 11/08* (2013.01); *C22B 3/12* (2013.01); *C22B 3/1608* (2013.01); *C22B 3/1666* (2013.01); *C22B 3/20* (2013.01); *C22B 15/0065* (2013.01); *C22B 15/0084* (2013.01); *C22B 43/00* (2013.01); *C22B 60/0247* (2013.01); *C22B 60/0252* (2013.01); *Y02P 10/20* (2015.11)

(58) Field of Classification Search
CPC ......... C22B 11/08; C22B 3/12; C22B 3/1608; C22B 3/1666; C22B 15/0065; C22B 60/0247
See application file for complete search history.

(56) References Cited

U.S. PATENT DOCUMENTS

2016/0298209 A1 * 10/2016 Mujicic .................. C22B 11/04

* cited by examiner

*Primary Examiner* — Steven J Bos
(74) *Attorney, Agent, or Firm* — Joseph T. Guy; Patent Filing Specialist Inc.

(57) ABSTRACT

A solution for leaching metals from clay containing ore and a method of leaching ore is described. The solution comprises a cyanide; a wetting agent; and a clay stabilizing polymer.

29 Claims, 3 Drawing Sheets

PROCESS FOR RECOVERING PRECIOUS METALS FROM CLAY-CONTAINING ORES

This application is a divisional application of pending U.S. patent application Ser. No. 15/398,846 filed Jan. 5, 2017 which is incorporated herein by reference.

BACKGROUND

The present invention is related to an improved process for recovering metals, particularly precious metals, from clay-containing ores. More specifically, the present invention is related to the use of specific polymers and wetting agents for improved metal recovery from clay.

Heap leaching is an industrial mining process for the extraction of metals such as gold, silver, copper, uranium, and other compounds from ore. The process includes the use of chemical reactions to form complexes with specific minerals and then releases these minerals after their division from other earth materials. Similar to in situ mining, heap leach mining differs in that it places ore on a liner with chemicals added via drip systems to the ore.

The mined ore is usually crushed into small chunks and heaped on an impermeable plastic and/or clay lined leach pad where it can be irrigated with a leach solution to dissolve the valuable metals. While sprinklers are occasionally used for irrigation, drip irrigation is preferred to minimize evaporation, provide more uniform distribution of the leach solution, and to avoid damaging the exposed mineral. The solution percolates through the heap and leaches both the target as well as other minerals. This process, called the "leach cycle," generally takes one or two months for simple oxide ores, such as most gold ores, to two years for other ores such as nickel laterite ores. The leach solution containing the dissolved minerals is typically collected, treated in a process plant to recover the target mineral and in some cases precipitate other minerals, and then recycled to the heap after reagent levels are adjusted. Ultimate recovery of the target mineral can range from 30% of contained ores, such as run-of-mine dump leaching sulfide copper ores, to over 90% for the easiest to leach ores such as some of the oxide gold ores.

The crushed ore is irrigated with a dilute alkaline cyanide solution. The solution containing the dissolved metals, typically referred in the art as pregnant solution, continues percolating through the crushed ore until it reaches the liner at the bottom of the heap where it drains into a storage pond which is often referred to in the art as a pregnant solution pond. After separating the metals from the pregnant solution, the dilute cyanide solution, typically referred to in the art as a "barren solution", is normally re-used in the heap-leach-process or occasionally sent to an industrial water treatment facility where the residual cyanide is treated and residual metals are removed. In very high rainfall areas, such as the tropics, in some cases there is surplus water which may be discharged to the environment, after treatment. This practice can cause water pollution if improperly performed.

The process generates a large volume of waste material and is rather burdensome on a large scale. By way of example, the production of the equivalent of one gold ring through the heap method can generate 20 tons of waste material.

During the extraction phase, gold ions are solubilized by forming complex ions with cyanide:

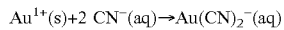

According to J. B. Hiskey, Arizona Bureau of Geology and Mineral Technology Fieldnotes, Vol. 15, No. 4, Winter 1985, gold is dissolved in an aerated cyanide solution according to the following two-step reaction sequence:

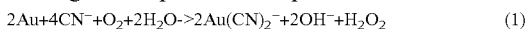

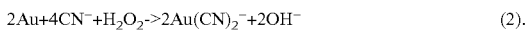

Recuperation of the gold is readily achieved with a redox-reaction or with electrowinning, also called electro-extraction, wherein metals are electrodeposited from their ores that have been put in solution. Electrorefining uses a similar process to remove impurities from a metal. Both processes use electroplating on a large scale and are important techniques for the economical and straightforward purification of non-ferrous metals.

In electrowinning, a current is passed from an inert anode through a liquid leach solution containing the metal. The metal is extracted as it is deposited in an electroplating process onto the cathode. In electrorefining, the anodes consist of unrefined impure metal. As the current passes through the acidic electrolyte the anodes are corroded into the solution so that the electroplating process deposits refined pure metal onto the cathodes.

Clay in ore can interfere with the leaching process. Certain clays can hydrate and swell when exposed to the aqueous leaching solution. The swollen clay particles can slow or block the flow of leaching solution through the heap and thus reduce leaching productivity. Therefore, there is a need in the mining industry for materials or processes which minimize the deleterious effects of clay swelling on heap leaching productivity.

In spite of the ongoing effort those of skill in the art still do not have a suitable option for mitigating the productivity losses associated with clay in heap leaching.

SUMMARY OF THE INVENTION

It is an object of the invention to provide an improved solution for extraction of metals, particularly precious metals, from clay and an improved process related thereto.

It is another object of the invention to provide a solution which increases the efficiency of metal extraction, particularly precious metals extraction, from clay without alteration of the extraction bed or process steps.

These and other advantages, as will be realized, are provided in a solution for leaching metals, particularly precious metals, from clay containing ore comprising: cyanide; a wetting agent; and a clay stabilizing polymer.

A method for heap leaching of metals from clay containing ore comprising: forming a heap of ore on a leach bed; percolating a leach solution through the heap wherein the leach solution comprises cyanide; a wetting agent; and a clay stabilizing polymer; thereby forming a pregnant leach solution comprising the precious metal; and removing the precious metal from the pregnant leach solution.

FIGURES

DESCRIPTION

Figure 1:
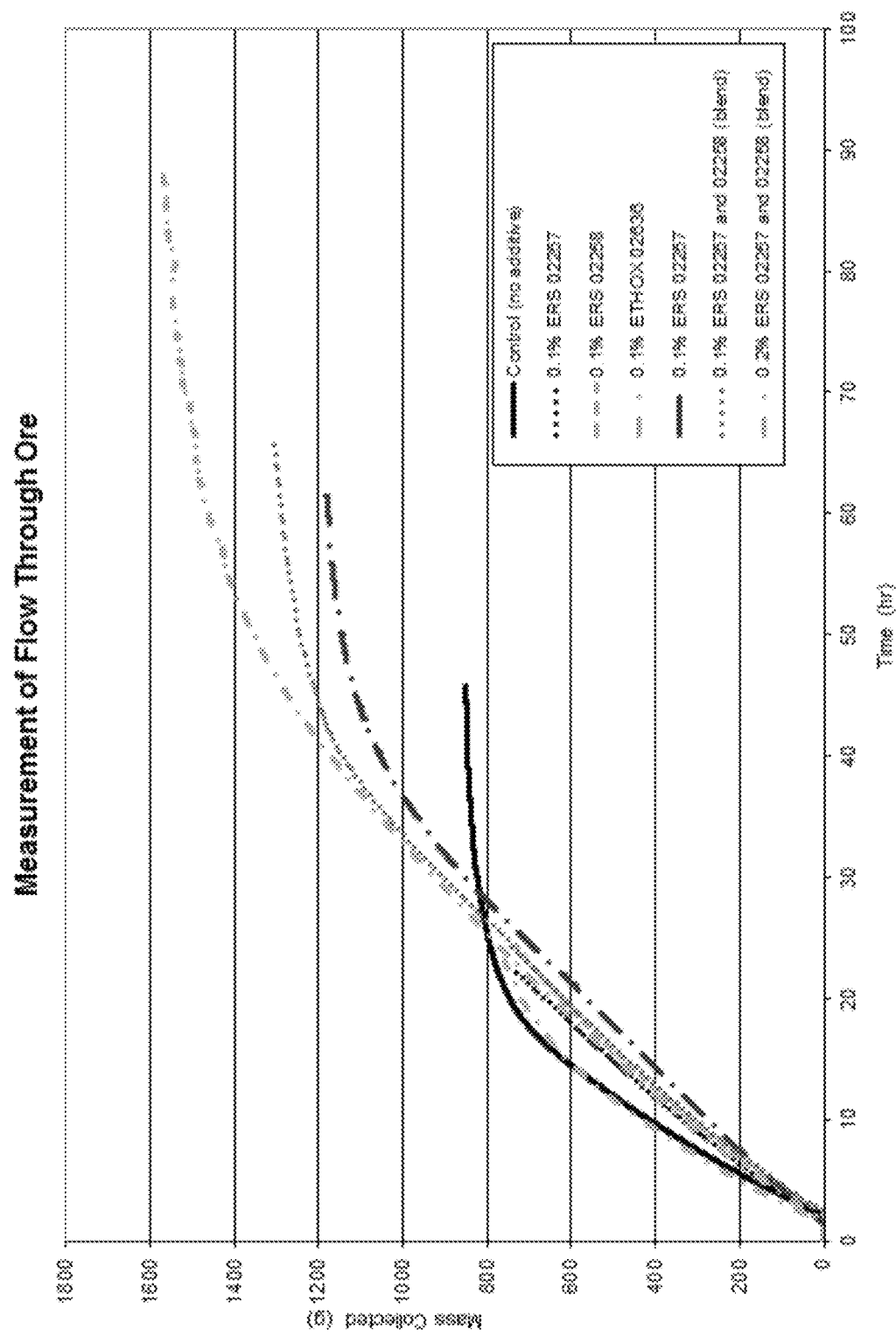
FIG. 1 is a graphical representation of an embodiment of the invention.

The instant invention is directed to the addition of certain additives to the cyanide based heap leaching solution to increase percolation rates of the solution through the heap, or at least to minimize drop off in leaching rates with time. More specifically, the present invention is directed to a leach solution for improved extraction of metals from clay wherein the solution comprises cyanide, a wetting agent and at least one clay stabilizing polymer additive.

Crude clay deposits, such as Georgia kaolins, contain micrometer-size particles, ranging in size from about 0.1 microns to 15 microns. Particles at the smaller end of this range tend to be plate-like in shape, with their diameters about 6 to 10 times their thickness. Larger particles comprise stacks of particles that adhere in a face-to-face manner, like a stack of coins. Larger, granular clay particles can be broken down into smaller, delaminated particles by splitting the layered stacks into thin, plate-like units. Clay is a naturally occurring mineral in the phyllosilicate category, consisting of aluminum silicate as a principal component, along with various other metals such as calcium, potassium and magnesium, with varying levels of water content. Clays are formed from alternating sheets of tetrahedral $SiO_4$ and octahedral $AlO_4$, with the two sheets forming a layer. If a layer includes only one silica sheet and one alumina sheet, it is termed a 1:1 clay. Kaolin is an example of such a clay. These layers are tightly attached through hydrogen bonding. If, on the other hand, a layer is made of three sheets, as a silica-aluminum-silica sandwich, the clay is termed a 2:1 clay. Layers are attached to each other by van der Waals forces. There is a gap of about 1 nm between the layers, called the "gallery," where various cations such as sodium, magnesium, calcium and lithium may reside. The smectite family of clays, such as montmorillonite, hectorite and saponite are 2:1 clays.

While not limited to theory, it is hypothesized that the clays shear, or become separated along faces, in the presence of water thereby exposing hydrophilic portions which migrate, or wick, with the water flow. The result is believed to be a physical plugging of flow paths of the cyanide solution thereby reducing the effectiveness of the leaching operation. Still without limit to theory, it is hypothesized that the clay stabilizing polymer additive stabilizes the clay by impeding the breakdown of the clay particles thereby minimizing their ability to block flow passages. Further without limit to theory, the wetting agent is believed to improve the function of the clay stabilizing polymer additive with regards to the ability of the polymer additive to stabilize the clay.

The leach solution is preferably basic. More preferably, the leach solution has a pH of at least 8 to no more than about 11. Below a pH of about 8 the reaction of the cyanide with the metal is inefficient. Above a pH of about 11 the leach solution is caustic which increases handling difficulties and increases the rate of equipment corrosion. A pH of about 9.5 to 10.5 is optimal.

The clay stabilizing polymer additive is selected from a polyalkylene oxide copolymer; propoxylated glycols; polyamine copolymers comprising dicyandiamide, formaldehyde and ammonia; polyvinyl alcohol; partially hydrolyzed polyvinyl acetate; polyacrylamide; quaternary amines and particularly tetramethyl ammonium salts; carboxymethyl cellulose; methacrylate copolymers; hydroxyaldehydes; hydroxyketones; and copolymers of anionic or cationic monomers, more preferably cationic monomers. Particularly preferred is a clay stabilizing polymer additive selected from a polyalkylene oxide copolymer, propoxylated glycols and polyamine copolymer comprising dicyandiamide, formaldehyde and ammonia. The clay stabilizing polymer absorbs onto the clay or shale thereby inhibiting separation through shearing. The clay stabilizing polymer additive is either a high molecular weight polymer with limited solubility, which is believed to cause the polymer to form somewhat of a barrier on the clay, or a charged species which electrostatically forms a barrier on the clay.

The polyalkylene oxide copolymer preferably comprising a polypropylene oxide (PO) block, and at least one polymeric block selected from the group consisting of polyethylene oxide (EO), aromatic polyester, and aliphatic polyester.

More specifically, the polyalkylene oxide copolymer is defined by formula:

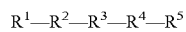

wherein:
$R^1$ and $R^5$ are terminal groups independently selected from the group consisting of H, hydroxyl, saturated or unsaturated aliphatic of 1 to 30 carbons, —OC(O)$R^6$ wherein $R^6$ is a hydrogen or a saturated or unsaturated aliphatic of 1 to 30 carbons;
at least one of $R^2$, $R^3$ or $R^4$ is polypropylene oxide (PO) with 1 to 100 PO groups and preferably 2 to 100 PO groups;
$R^2$, $R^3$ or $R^4$ is otherwise independently selected from the groups consisting of: polyethylene oxide (EO) with 1 to 100 EO groups and preferably 2 to 100 EO groups; polypropylene oxide (PO) with 1 to 100 PO groups and preferably 2 to 100 PO groups with the proviso that at least one of $R^2$, $R^3$ and $R^4$ is not PO; polyester defined by —(OC(O)$R^7$C(O)O)$_z$— wherein $R^7$ is aromatic with at least one to no more than four aromatic rings or a saturated or unsaturated aliphatic with 1 to 20 carbons and z is an integer of 1 to 100 and preferably 2 to 100. In a preferred embodiment $R^3$ is PO and $R^2$, $R^3$ and $R^4$ are independently selected from EO and polyester.

The polyalkylene oxide copolymer preferably comprises PO and EO with the ratio of PO/EO being at a ratio sufficient to maintain a low solubility in water and have high affinity for the clay particle surface. It is preferable that the polyalkylene oxide copolymer have low solubility in water. However, it is preferable that the polyalkylene oxide copolymer have enough water solubility to be dispersible in water thereby allowing the polyalkylene oxide copolymer to be delivered from water and to adsorb over the surface of the clay particles so some level of solubilizing groups is believed to be necessary. A high level of PO in the polymer increases its affinity for the clay surface and decreases its water solubility so that it is not easily washed off in the leaching process. It is particularly preferred that the polyalkylene oxide copolymer have at least 10% up to 50% EO and at least 40 to 90% PO with the proviso that the low solubility is realized. The polyalkylene oxide copolymer needs to have a molecular weight and polymer chain length sufficient to enable the polymer to cover the clay particle sufficiently to slow the exfoliation process. Longer blocks of polypropylene glycol in the copolymers increase the affinity for coating clay particles reduce its proclivity to wash off during the leaching process.

Alkoxylated glycols comprise a glycol backbone with repeat units derived from alkylene oxide. More specifically, the alkoxylated glycols are defined by the formula:

wherein X is a linking group derived from an organic compound containing at least two hydroxyl or amine groups capable of reacting with ethylene oxide;
each $R^{17}$ is independently —H or —CH$_3$, branched or linear aryl or alkyl moieties of 2-22 carbons which can be unsubstituted or substituted, and may also be —CH$_2$OR$^{19}$ groups such as those arising from the reaction of an alkyl or aryl glycidyl ether with the proviso that at least one R$^{17}$ is not hydrogen;

each R$^{18}$ is independently —H, unsubstituted or substituted aryl or alkyl hydrocarbon chains of 1-25 carbons which may be saturated or unsaturated, or an ester group —C(=O)R$^{20}$;

R$^{19}$ is a branched or linear aryl or alkyl moiety of 1-22 carbons which can be substituted or unsubstituted;

R$^{20}$ is unsubstituted or substituted aryl or alkyl hydrocarbon chain of 1-25 carbons which may be saturated or unsaturated;

s is an integer of 3-300;

t is an integer of 2-12.

The linking group, designated X in Formula 1, is selected from polyols and polyamines comprising at least two reactive alcohol or amine hydrogens. The linking group may comprise a linear or branched, optionally substituted, alkyl of 3-100 carbons. In one embodiment, all of the labile alcohol or amine hydrogens are derivatized to form a pendant group attached thereto, however in other embodiments alcohols and/or amines remain to increase the hydrophilicity of the core. Particularly preferred linking groups are selected from the group consisting of ethylene glycol, ethylene diamine, ethylene triamine, glycerin, trimethylol propane, pentaerythritol, sorbitol, sorbitan, diglycerol, triglycerol, higher polyglycerols, and polysaccharides or other polyols such as polyvinyl alcohol with a molecular weight of up to 400 Da.

A particularly preferred alkoxylated glycol is defined by the formula:

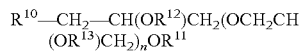

R$^{10}$—CH$_2$—CH(OR$^{12}$)CH$_2$(OCH$_2$CH(OR$^{13}$)CH$_2$)$_n$OR$^{11}$ wherein R$^{10}$ and R$^{11}$ are terminal groups independently selected from the group consisting of H, hydroxyl, saturated or unsaturated aliphatic of 1 to 30 carbons; or OC(O)R$^{15}$ wherein R$^{15}$ is a hydrogen or a saturated or unsaturated aliphatic of 1 to 30 carbons;

R$^{12}$, R$^{13}$ are independently selected from polyethylene oxide (EO) with 1 to 100 EO groups and preferably 2 to 100 EO groups; polypropylene oxide (PO) with 1 to 100 PO groups and preferably 2 to 100 PO groups; or —(CH$_2$CHR$^{16}$O)$_r$— wherein each R$^{16}$ is independently hydrogen or methyl and r is an integer of 1 to 100 and preferably 2 to 100 and n is an integer of 1 to 4.

The polyamine copolymer is defined as comprising dicyandiamide, formaldehyde and ammonia with a hydroxyl number of at least 20 to no more than 35 and more preferably a hydroxyl number of at least 26 to no more than 31. Below a hydroxyl number of 20 the polyamine is insufficiently bound to the clay and therefore the benefits are muted. Above a hydroxyl number of 35 the solubility increases thereby muting the ability of the polyamine copolymer to precipitate onto the surface.

The cyanide solution is an aqueous solution preferably comprises at least 50 ppm cyanide to no more than 1000 ppm cyanide. Below about 50 ppm cyanide the rate of extraction of the metals is insufficient for commercial use. Above about 1000 ppm the rate of extraction of the metals is not increased to the degree necessary to justify the additional material usage. More preferably, the cyanide solution comprises at least about 200 to no more than about 800 ppm cyanide The wetting agent is preferably selected from the group consisting of alcohol alkylates preferably chosen from alcohol ethoxylates and alcohol propoxylates; polyethylene glycol esters with 3 to 20 and more preferably 7 to 12 polyethylene groups; hydrophilic modified silicones, fatty amine ethoxylates and sulfosuccinates, particularly dioctyl sodium sulfosuccinate (doss).

Alcohol ethoxylates are non-ionic surfactants composed of an alkyl chain with 5-20 carbon atoms, and more preferably 10-15 carbon atoms, combined with 2 to 20 ethylene oxide units, and preferable 3 to 14 ethylene oxide units.

In the process for extracting metals from clay rich ore the mined ore is crushed into small particles to increase the surface area. The crushed ore is then placed on a leach pad with an impermeable plastic and/or clay lined leach pad in thick regions referred to as heaps. The heaps are then treated with leach solution comprising cyanide, wetting agent, and a polymer as described elsewhere herein by any technique known in the art such as drip irrigation, sprinkling and the like such that the solution percolates through the ore leaching out precious metals as it percolates thereby forming a pregnant leach solution. The pregnant leach solution is then treated to isolate the metals. In a preferred embodiment the leach solution, after isolation of the metals therefrom, is regenerated by adding depleted chemicals and then reused as recycled solution.

Throughout the description terms such as aliphatic, aromatic and alkyl refer to either substituted or unsubstituted groups. The terms aliphatic and alkyl refer to saturated and unsaturated unless otherwise specified.

Example 1

Two techniques were used to measure the effectiveness of the inventive solution. One technique was a flow through method utilizing a column assembly wherein the solution was allowed to flow through the column with aspirator vacuum assist. A second technique utilized a slurry wherein the solution being tested was mixed with soil and later separated from the soil by filtration.

For the flow through method, a column assembly was prepared using a Buchner funnel fitted with a #4 Whatman filter. A polyethylene column of different heights was formed from a cylindrical sleeve cut from polyethylene sample bottles. The column assembly was placed on a filter flask connected to a sink aspirator. The column was charged with 100 ml of soil followed by flow through extraction with 100 mL of solution under aspirator vacuum to facilitate liquid leaching through the soil.

For the slurry method 100 mL of soil was introduced into a 500 mL beaker followed by addition of 100 mL of solution. The materials were swirled for approximately 5 minutes to completely wet the soil. The slurry was allowed to sit for 60 minutes followed by filtration of the slurry using a Buchner funnel fitted with a #4 Whatman filter with aspirator vacuum assist.

In the Tables samples A1-A5 were tested by the column method and samples B1-B5 were tested by the slurry method. A stock extract solution of 500 ppm NaCN was formed by diluting 125 mL of 2.5% NaCN with 500 mL water to form 625 mL of solution. A spiked extract solution was made by adding 2 g of additive to 198 g of the 500 ppm NaCN stock extract solution. In each case the amount of liquid recovered was determined as was the metals extracted. Results are presented in Table 1 wherein "Solution" lists the additive. The column labelled "Drop" reports the time required to collect the first drop of liquid. The column labelled "100 mL" reports the time required for loading 100 mL of extracting solution into the funnel.

TABLE 1

| Sample | Solution Additive | Soil (g) | Drop (min:sec) | 100 mL (min:sec) | Collected (g) | Comment |
|---|---|---|---|---|---|---|
| A1 | — | 134.13 | 8:20 | 29:30 | 55.68 | |
| A2 | CS-1550 | 134.28 | 7:40 | 31:00 | 56.1870 | A |
| A3 | CS-1420 | 134.27 | 0:50 | 7:25 | 63.5577 | |
| A4 | CS-1420ST | 134.22 | 3:39 | 14:25 | 59.1784 | |
| A5 | Ethox 4439 | 134.28 | 0:41 | 7:00 | 63.5230 | B |
| B1 | — | 134.30 | | | 59.4055 | |
| B2 | CS-1550 | 134.25 | | | 59.2633 | C |
| B3 | CS-1420 | 135.55 | | | 57.1100 | |
| B4 | CS-1420ST | 134.43 | | | 60.2596 | D |
| B5 | Ethox 4439 | 134.11 | | | 53.8605 | |

In the comments of Table 1, A indicates the solution was light orange and turned darker after sitting, B indicates the material foamed during filtration, C indicates the solution was dark orange and D indicates that the vacuum pulled gas from solution.

For the purposes of the experiments, NaCN was purchased as 2.5% (w/v) from LabChem, Inc. Zelienople, PA Cat # LC23700-7 lot# D008-12 Exp Jan. 9, 2016. HPLC grade water was used unless otherwise stated. CS-1550, a very low molecular weight, high charge density polyamine clay stabilizer, was obtained from Polymer Ventures of Charleston, S.C. It is believed to be a terpolymer of dicyandiamide, formaldehyde, and ammonium chloride. CS-1420 is a low molecular weight, high charge density polyamine clay stabilizer obtained from Polymer Ventures of Charleston, S.C. CS-1420ST is a salt tolerant low molecular weight, high charge density polyamine clay stabilizer available from Polymer Ventures of Charleston, S.C. Ethox 4439 is a commercially available ethylene oxide-propylene oxide-ethylene oxide block copolymer with 40% ethylene oxide available from Ethox Chemicals, LLC as P-104. Extracts of collected solution were sent to Nevada Analytical Services in Reno, Nev. 89502 for analysis by ICP-AES. The results are presented in Tables 2-4 wherein the metal is reported in ppm relative to the extract in Table 2, in mg in the extract in Table 3, and in ppm in soil in Table 4. Reporting as concentration in soil normalizes the results in terms of the amount of extract collected as well as the amount of soil tested.

In Tables 2-4 soil and solution collected are reported in grams, ND indicates below reporting limit, i.e., <0.25 ppm for Au and Ag, <0.20 ppm for Hg, NA indicates not applicable. The amount of each metal in the extract was calculated by the formula: $A=(B \times C)/1000$ wherein: A is the amount of metal in extract in mg, B is the amount of extract in grams and C is the concentration in the extract in ppm. Concentration of metals in the original sample were calculated by the formula: $D=1000 \times A/E$, wherein A is the amount of metal in extract in mg; D is the concentration of metals in the original sample in ppm, E is the amount of soil tested in grams. The results are provided in Table 2. In the results provided in Table 2 gold was not detected. Extraction of Au was not observed due to the low level of Au in the soil and the test scale. Based on expected correlation Ag and Hg extraction efficiencies are expected to correlate to Au extraction. In Table 2 the metals are determined from ore extract and reported in ppm relative to the amount of extract. In Table 3 the metals are determined from ore extract and are reported in mg in the extract. In Table 4, the metals are determined from ore extract, reported in ppm relative to the amount of soil.

TABLE 2

| Sample | Soil (g) | Solution Collected (g) | Au (ppm) | Ag (ppm) | Hg (ppm) |
|---|---|---|---|---|---|
| A1 | 134.13 | 55.6800 | ND | 0.27 | 0.34 |
| A2 | 134.28 | 56.1870 | ND | 0.50 | 0.60 |
| A3 | 134.27 | 63.5577 | ND | ND | 0.25 |
| A4 | 134.22 | 59.1784 | ND | 0.29 | 0.44 |
| A5 | 134.28 | 63.5230 | ND | ND | 0.20 |
| B1 | 134.30 | 59.4055 | ND | ND | 0.28 |
| B2 | 134.25 | 59.2633 | ND | 0.26 | ND |
| B3 | 135.55 | 57.1100 | ND | 0.29 | 0.40 |
| B4 | 134.43 | 60.2596 | ND | ND | 0.27 |
| B5 | 134.11 | 53.8605 | ND | ND | 0.27 |

TABLE 3

| Sample | Soil (g) | Solution Collected (g) | Au (ppm) | Ag (ppm) | Hg (ppm) |
|---|---|---|---|---|---|
| A1 | 134.13 | 55.6800 | NA | 0.015 | 0.019 |
| A2 | 134.28 | 56.1870 | NA | 0.028 | 0.034 |
| A3 | 134.27 | 63.5577 | NA | NA | 0.016 |
| A4 | 134.22 | 59.1784 | NA | 0.017 | 0.026 |
| A5 | 134.28 | 63.5230 | NA | NA | 0.013 |
| B1 | 134.30 | 59.4055 | NA | NA | 0.017 |
| B2 | 134.25 | 59.2633 | NA | 0.015 | NA |
| B3 | 135.55 | 57.1100 | NA | 0.017 | 0.023 |
| B4 | 134.43 | 60.2596 | NA | NA | 0.016 |
| B5 | 134.11 | 53.8605 | NA | NA | 0.015 |

TABLE 4

| Sample | Soil (g) | Solution Collected (g) | Au (ppm) | Ag (ppm) | Hg (ppm) |
|---|---|---|---|---|---|
| A1 | 134.13 | 55.6800 | NA | 0.112 | 0.141 |
| A2 | 134.28 | 56.1870 | NA | 0.209 | 0.251 |
| A3 | 134.27 | 63.5577 | NA | NA | 0.118 |
| A4 | 134.22 | 59.1784 | NA | 0.128 | 0.194 |
| A5 | 134.28 | 63.5230 | NA | NA | 0.095 |
| B1 | 134.30 | 59.4055 | NA | NA | 0.124 |
| B2 | 134.25 | 59.2633 | NA | 0.115 | NA |
| B3 | 135.55 | 57.1100 | NA | 0.122 | 0.169 |
| B4 | 134.43 | 60.2596 | NA | NA | 0.121 |
| B5 | 134.11 | 53.8605 | NA | NA | 0.108 |

From these data it is apparent that all of the solutions that contained a clay stabilizer (A2-A5) had more leach solution collected through the column than the blank solution with no clay stabilizer. CS-1420 and Ethox 4439 filter much more quickly through soil than the solution with no treatment (A1), and solutions prepared with CS-1550 and CS-1420ST. Metal determination data suggested that the concentration of metal in the soil was too low to obtain results that were much greater than the detection limits of the methods.

Example 2

A column which was 0.914 M (3 feet) tall and 5.08 cm (2 inches) in diameter was fitted on one end with a plastic Buchner funnel. The column was charged with 1300 grams of soil filling about ⅔ of the column. The column was tapped hard onto a rubber pad about 20 times to ensure that the soil was tightly packed. Two liters of solution were prepared containing 500 ppm NaCN and 0.1% NaOH in deionized water and additive as indicated in Table 5. The solutions were poured into the top of the column, above the soil to wet the soil, and the excess amount continuously fed from this beaker into the top of the column by a pump. Any overflow was returned to the source beaker by way of an overflow tube thereby maintaining approximately 12 inches of solution on top of the soil. The column effluent was captured in a separate beaker on a top loading balance with 0.1 gram of readability. The mass was recorded automatically into a data file. An increase in the time required for the flow to cease, as measured by the weight of effluent remaining substantially unchanged, was defined as an indication of a decrease in the blockage of flow passages with a rate of 0.05 g/min used as the endpoint. Many samples were tested with a subset of the results provided in Table 5 and illustrated graphically in FIG. 1.

From the graph it is apparent that the rate of collection of control solution, which contained no additive, slowed considerable after 25 hours, when approximately 800 grams of solution had been collected. Solutions which contained additives maintained a higher flow rate for a longer period of time. The additive ERS 02257 is a commercially available ethylene oxide-propylene oxide-ethylene oxide copolymer available from Ethox Chemicals LLC as ETHOX 4439 or P-104. ERS 02258 is a terpolymer of dicyandiamide and formaldehyde and ammonium chloride. Measurement of the sample containing 0.1% ERS 02257 was aborted due to technical difficulties.

A particularly preferred embodiment is a mixture of clay stabilizing polymers, indicated as "ERS 02257 and 02258 blend" in the graph. This solution continued to flow through the soil beyond 60 hours, at which time over 1400 grams of solution were collected. The major component of the blend, ERS 02254 (Ethox P-104) which is a block copolymer of approximately 54 moles of propylene oxide and 64 moles of ethylene oxide on diethylene glycol. The material has a molecular weight of approximately 6000 Daltons. The second material, ERS 02258 (CS-1550) is a material that is sold by Polymer Ventures, Charleston, S.C., and is promoted by that company to be a clay stabilizing agent.

As described in Table 5, the 0.2% blend of ERS 02257 and ERS 02258 showed the greatest improvement in terms of time (233%) and amount of solution filtered (184%). Of the 0.2% blend, 75% consisted of ERS 02257, 25% was ERS 02258. Field testing of this material at a gold mine confirmed greater throughput of material as compared with solution that did not contain this blend.

Example 3

Laboratory testing continued during field trials of the 0.2% blend of ERS 02257 and ERS 02258. The test method was modified from that described in Example 2, to decrease total test time so more materials could be evaluated in a shorter amount of time. The same test column was used (3 feet long, 2 inch diameter), the same amount of ore (1300 grams) was packed into the column. In these tests all solutions were made with 0.2% additive and the same concentrations of sodium cyanide and sodium hydroxide as used previously. One liter of solution was tested, rather than 2 liters of solution, and the solution was passed through the ore only a single time, rather than recirculated. As before, the mass was monitored as a function of time. Mass of pregnant solution collected was plotted as a function of time in the graphs shown in FIGS. 2 and 3. In these graphs, plots obtained for treated solutions may be compared to plots obtained from data collected for a control solution (labeled "blank" in FIGS. 2 and 3). This aqueous solution contained only sodium cyanide and sodium hydroxide. The objective of this test is to identify additives that prevent pooling of solution when it is placed on a heap of ore. Solutions that prevent pooling are expected to pass through the heap at a faster rate.

Voranol CP 6001 Polyol, a glycerol, propylene oxide, and ethylene oxide polymer, which is sold by Dow Chemicals, was evaluated as a replacement for ERS 02257.

Figure 2:
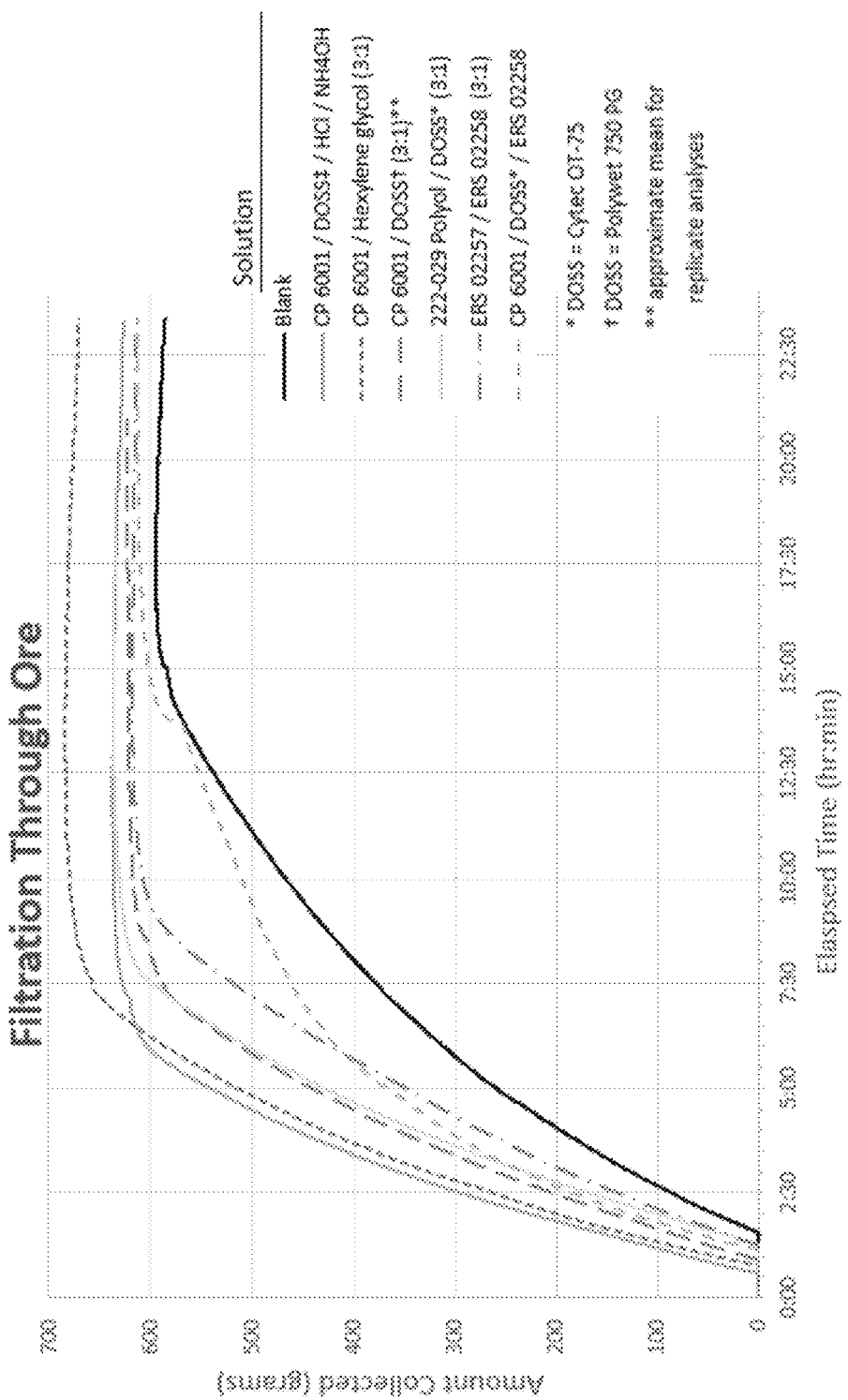
FIG. 2 is a graphical representation of an embodiment of the invention.

Wetting agents were evaluated for replacement of ERS 02258 in the blend. Compounds which are commonly used as soil wetting agents were chosen for evaluation. A blend of 75% Voranol CP 6001 and 25% dioctyl sodium sulfosuccinate (DOSS) performed well in the filtration test, shown in FIG. 2, plotted with long dashes, as compared with the original blend (75% ERS 02257 and 25% ERS 02258), shown in the gray trace with the long dash and dot, in the same figure. A faster flow rate was observed for the solution which contained 75% Voranol CP 6001/25% DOSS.

The Voranol CP 6001/DOSS blend was found to separate upon aging. Adjustment of the blend to pH 5 with hydrochloric acid prevented separation. The pH was readjusted to pH 10 with ammonium hydroxide and the material remained in a single liquid phase. This reformulated blend was clear and was found to perform well in ore extraction laboratory tests (compare the solid dark grey trace in FIG. 3 labeled.

Voranol 6001/DOSS/HCl/$NH_4OH$ to the dashed gray line labeled CP/6001/DOSS). A second material from Dow, 222-029 polyol, a polyalkylene glycol, was also evaluated as a replacement for ERS 02257. A blend of 75% 222-09 and 25% DOSS solution performed as well as the Voranol CP 6001/DOSS solution.

Figure 3:
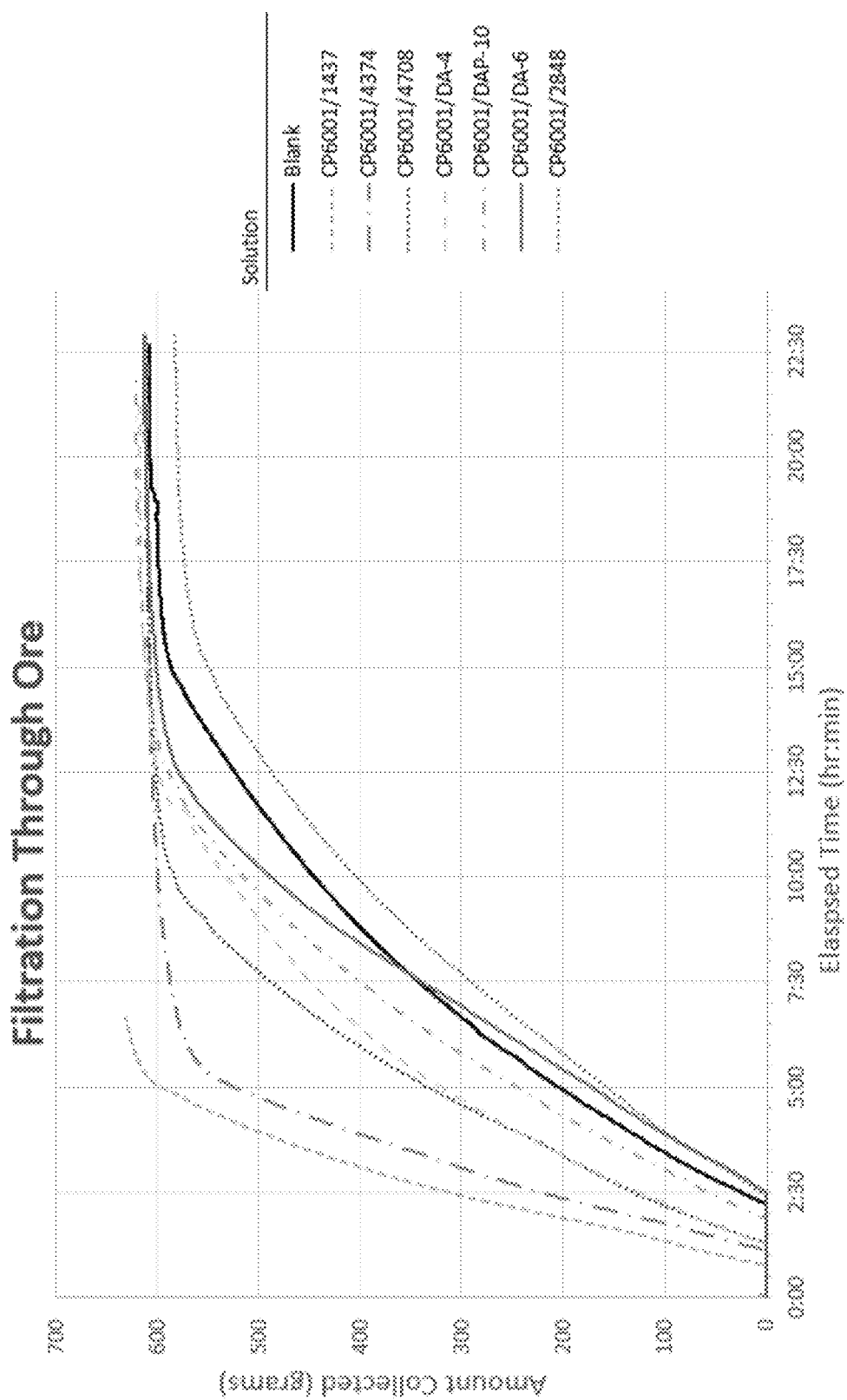
FIG. 3 is a graphical representation of an embodiment of the invention.

Other blends were prepared using Voranol CP 6001, their plots are shown in FIGS. 2 and 3. All but one of these showed improvement in flow of solution through ores, as compared with the untreated solution, labeled "blank". The other wetting agents tested were: hexylene glycol; a combination of DOSS and ERS 02258; decyl alcohol with 2 moles propylene oxide (PO) and 4 moles ethylene oxide (EO), labeled 1437; undecyl alcohol with 7 moles of EO, labeled 4374; a blend containing tridecyl alcohol with 9 moles of EO labeled 4708; decyl alcohol with 4 moles of EO labeled DA-4; decyl alcohol with 6 moles of EO, labeled DA-6; diamyl phenol with 10 moles of EO, labeled DAP-10; octyl-decyl alcohol with 4 moles each of PO and EO, labeled 2848. The results shown in FIGS. 2 and 3 may be compared in terms of two attributes, wetting and flow rate. Wetting speed is indicated by the amount of time it took to begin collection of solvent. The wetting time of the control (labeled "blank" and indicated by solid black line) was tested twice and was found to be 1.5 and 2 hours, as indicated by FIGS. 2 and 3 respectively. Nearly all of the solutions which contained additives has shorter wetting speeds than the control solution.

Flow rates may be compared by reporting the amount of time required to pass 550 grams of each solution through the column. This mass represents a time when a significant portion of the solution has passed through the column, wetting the ore, and yet some of the liquid solution remains on top of the ore and the ore has not become dry. These times are reported in Table 6 for solutions that were tested in this example. All solutions which contained additives, except for the one prepared with Voranol CP6001 and Ethox 2848, had faster flow rates than the control sample (reported as "Blank", based on the shorter elution time required to collect 550 grams of solution.

TABLE 5

| Solution | Stop time (hrs) | Improvement | Stop mass (grams) | Improvement |
|---|---|---|---|---|
| Control (no additive) | 30 | NA | 823 | NA |
| 0.1% ERS 02257 | 57 | 190% | 1172 | 142% |
| 0.1% ERS 02257 and 02258 (blend) | 60 | 200% | 1289 | 157% |
| 0.2% ERS 02257 and 02258 (blend) | 70 | 233% | 1514 | 184% |

TABLE 6

Time required to collect 550 grams of solution containing the indicated additive.

| Additive | Hrs:min |
|---|---|
| CP6001/1437 | 4:27 |
| Voranol CP 6001/DOSS* (3:1) | 4:54 |
| Voranol CP 6001/DOSS‡/HCl/NH$_4$OH | 5:07 |
| CP6001/4374 | 5:20 |
| Voranol CP 6001/Hexylene glycol (3:1) | 5:28 |
| Voranol CP 6001/DOSS‡ (9:1) | 6:20 |
| 222-029 Polyol/DOSS* (3:1) | 6:40 |
| ERS 02257 and 02258 (3:1) | 8:03 |
| CP6001/4708 | 8:52 |
| 8000/Hexylene glycol/DA-4 (45:5:50) | 9:15 |
| CP6001/DOSS‡/DA-4/HCl/NH$_4$OH | 9:51 |
| CP6001/DAP-10 | 10:58 |
| CP6001/DOSS‡ | 11:13 |
| CP6001/DA-6 | 11:28 |
| Voranol CP 6001/DOSS*/ERS 02258 | 12:21 |
| DOSS‡ | 12:23 |
| Blank | 12:58 |
| Blank | 13:26 |
| CP6001/2848 | 14:57 |

*DOSS = Cytec OT-75
† DOSS = Polywet 750 PG
‡DOSS = Ethox 4540

The invention has been described with reference to the preferred embodiments without limit thereto. One of skill in the art would realize additional embodiments and improvements which are not specifically set forth herein but which are within the scope of the invention as more specifically set forth in the claims appended hereto.

Claimed is:

1. A method for heap leaching of precious metal from clay containing ore comprising:
    forming a heap of ore on a leach bed;
    percolating a leach solution through said heap wherein said leach solution comprises:
        cyanide;
        a wetting agent; and
        a clay stabilizing polymer wherein said clay stabilizing polymer is selected from the group consisting of a polyalkylene oxide copolymer, a propoxylated glycol and a polyamine copolymer;
    thereby forming a pregnant leach solution comprising said precious metal; and
    removing said precious metal from said pregnant leach solution.

2. A method for heap leaching of precious metal from clay containing ore of claim 1 wherein said metal is selected from the group consisting of gold, silver, copper and uranium.

3. A method for heap leaching of precious metal from clay containing ore of claim 1 wherein said leach solution has a pH of at least 8 to no more than 11.

4. A method for heap leaching of precious metal from clay containing ore of claim 3 wherein said leach solution has a pH of at least 9.5 to no more than 10.5.

5. A method for heap leaching of precious metal from clay containing ore of claim 1 wherein said leach solution comprises at least 50 ppm cyanide to no more than 1000 ppm cyanide.

6. A method for heap leaching of precious metal from clay containing ore of claim 5 wherein said leach solution comprises at least 200 ppm cyanide to no more than 800 ppm cyanide.

7. A method for heap leaching of precious metal from clay containing ore of claim 1 wherein said polyalkylene oxide copolymer is defined by:

$$R^1\text{—}R^2\text{—}R^3\text{—}R^4\text{—}R^5$$

wherein:
    $R^1$ and $R^5$ are terminal groups independently selected from the group consisting of H, hydroxyl, saturated or unsaturated aliphatic of 1 to 30 carbons, —OC(O)$R^6$ wherein $R^6$ is a hydrogen or a saturated or unsaturated aliphatic of 1 to 30 carbons;
    at least one of $R^2$, $R^3$ or $R^4$ is polypropylene oxide (PO) with 1 to 100 PO groups;
    $R^2$, $R^3$ or $R^4$ is otherwise independently selected from the group consisting of: polyethylene oxide (EO) with 1 to 100 EO groups;
    polypropylene oxide (PO) with 1 to 100 PO groups with the proviso that at least one of $R^2$, $R^3$ and $R^4$ is not PO; polyester defined by—(OC(O)$R^7$C(O)O)$_z$—wherein $R^7$ is aromatic with at least one to no more than four aromatic rings or a saturated or unsaturated aliphatic with 1 to 20 carbons and z is an integer of 1 to 100.

8. A method for heap leaching of precious metal from clay containing ore of claim 7 wherein said $R^2$, $R^3$ or $R^4$ is ethylene oxide with 2 to 100 EO groups.

9. A method for heap leaching of precious metal from clay containing ore of claim 7 wherein said $R^2$, $R^3$ or $R^4$ is propylene oxide with 2 to 100 PO groups.

10. A method for heap leaching of precious metal from clay containing ore of claim 7 wherein z is an integer of 2 to 100.

11. A method for heap leaching of precious metal from clay containing ore of claim 7 wherein $R^3$ is PO and $R^2$, $R^3$ and $R^4$ are independently selected from EO and polyester.

12. A method for heap leaching of precious metal from clay containing ore of claim 1 wherein said propoxylated glycol is defined by the formula:

$$X[(CH_2CHR^{17}O)_sR^{18}]_t$$

wherein X is a linking group derived from an organic compound containing at least two hydroxyl or amine groups capable of reacting with ethylene oxide;
each $R^{17}$ is independently —H or —CH$_3$, branched or linear aryl or alkyl moieties of 2-22 carbons which can be unsubstituted or substituted, and may also be —$CH_2OR^{19}$ groups such as those arising from the reaction of an alkyl or aryl glycidyl ether with the proviso that at least one $R^{17}$ is not hydrogen;

each $R^{18}$ is independently —H, unsubstituted or substituted aryl or alkyl hydrocarbon chains of 1-25 carbons which may be saturated or unsaturated, or an ester group —$C(=O)R^{20}$;

$R^{19}$ is a branched or linear aryl or alkyl moiety of 1-22 carbons which can be substituted or unsubstituted;

$R^{20}$ is unsubstituted or substituted aryl or alkyl hydrocarbon chain of 1-25 carbons which may be saturated or unsaturated;

s is an integer of 3-300;

t is an integer of 2-12.

13. A method for heap leaching of precious metal from clay containing ore of claim 1 wherein said propoxylated glycol is defined by the formula:

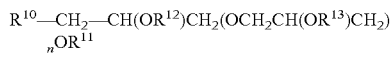

wherein $R^{10}$ and $R^{11}$ are terminal groups independently selected from selected from the group consisting of H, hydroxyl and saturated or unsaturated aliphatic of 1 to 30 carbons or $OC(O)R^{15}$ wherein $R^{15}$ is a hydrogen or a saturated or unsaturated aliphatic of 1 to 30 carbons;

$R_{12}$, $R^{13}$ are independently selected from polyethylene oxide (EO) with 1 to 100 EO groups; polypropylene oxide (PO) with 1 to 100 PO groups or —$(CH_2CHR^{16}O)_r$—;

$R^{16}$ is independently hydrogen or methyl;

r is an integer of 1 to 100; and n is an integer of 1 to 4.

14. A method for heap leaching of precious metal from clay containing ore of claim 13 wherein r is an integer of 2 to 100.

15. A method for heap leaching of precious metal from day containing ore of claim 13 wherein said $R^{12}$, $R^{13}$ are independently ethylene oxide having 2 to 100 EO groups.

16. A method for heap leaching of precious metal from day containing ore of claim 13 wherein said $R^{12}$, $R^{13}$ are independently propylene oxide having 2 to 100 PO groups.

17. A method for heap leaching of precious metal from clay containing ore of claim 1 wherein said polyamine comprises dicyandiamide, formaldehyde and ammonia.

18. A method for heap leaching of precious metal from clay containing ore of claim 17 wherein said polyamine has a hydroxyl number of at least 20 to no more than 35.

19. A method for heap leaching of precious metal from clay containing ore of claim 17 wherein said polyamine has a hydroxyl number of at least 26 to no more than 31.

20. A method for heap leaching of precious metal from day containing ore comprising:
    forming a heap of ore on a leach bed;
    percolating a leach solution through said heap wherein said leach solution comprises:
        cyanide;
        a wetting agent; and
        a clay stabilizing polymer;
    thereby forming a pregnant leach solution comprising said precious metal; and
    removing said precious metal from said pregnant leach solution; and
wherein said wetting agent is selected from the group consisting of alcohol ethoxylates; polyethylene glycol esters, hydrophilic modified silicones, and fatty amine ethoxylates.

21. A method for heap leaching of precious metal from clay containing ore of claim 20 wherein said clay stabilizing polymer is selected from the group consisting of polyalkylene oxide copolymer; propoxylated glycols; polyamine copolymer comprising dicyandiamide, formaldehyde and ammonia; polyvinyl alcohol; partially hydrolyzed polyvinyl acetate; polyacrylamide; quaternary amines; carboxymethyl cellulose; methacrylate copolymers; hydroxyaldehydes; hydroxyketones; and copolymers of anionic or cationic monomers.

22. A method for heap leaching of precious metal from clay containing ore of claim 20 wherein said polyethylene glycol esters has 3 to 20 polyethylene groups.

23. A method for heap leaching of precious metal from clay containing ore of claim 22 wherein said polyethylene glycol esters has 7 to 12 polyethylene groups.

24. A method for heap leaching of precious metal from clay containing ore of claim 20 wherein said alcohol ethoxylate has an alkyl chain with 5-20 carbon atoms.

25. A method for heap leaching of precious metal from clay containing ore of claim 24 wherein said alcohol ethoxylate has an alkyl chain with 10-15 carbon atoms.

26. A method for heap leaching of precious metal from clay containing ore of claim 20 wherein said alcohol ethoxylate has 2 to 20 ethylene oxide units.

27. A method for heap leaching of precious metal from clay containing ore of claim 26 wherein said alcohol ethoxylate has 3 to 14 ethylene oxide units.

28. A method for heap leaching of precious metal from day containing ore of claim 20 comprising:
    mixing said cyanide;
    said wetting agent and said clay stabilizing polymer at a pH below 7; and
    adjusting to a pH above 8.

29. A method for heap leaching of precious metal from day containing ore of claim 21 wherein said quaternary amines are tetramethylammonium salts.

* * * * *